Figure 1:
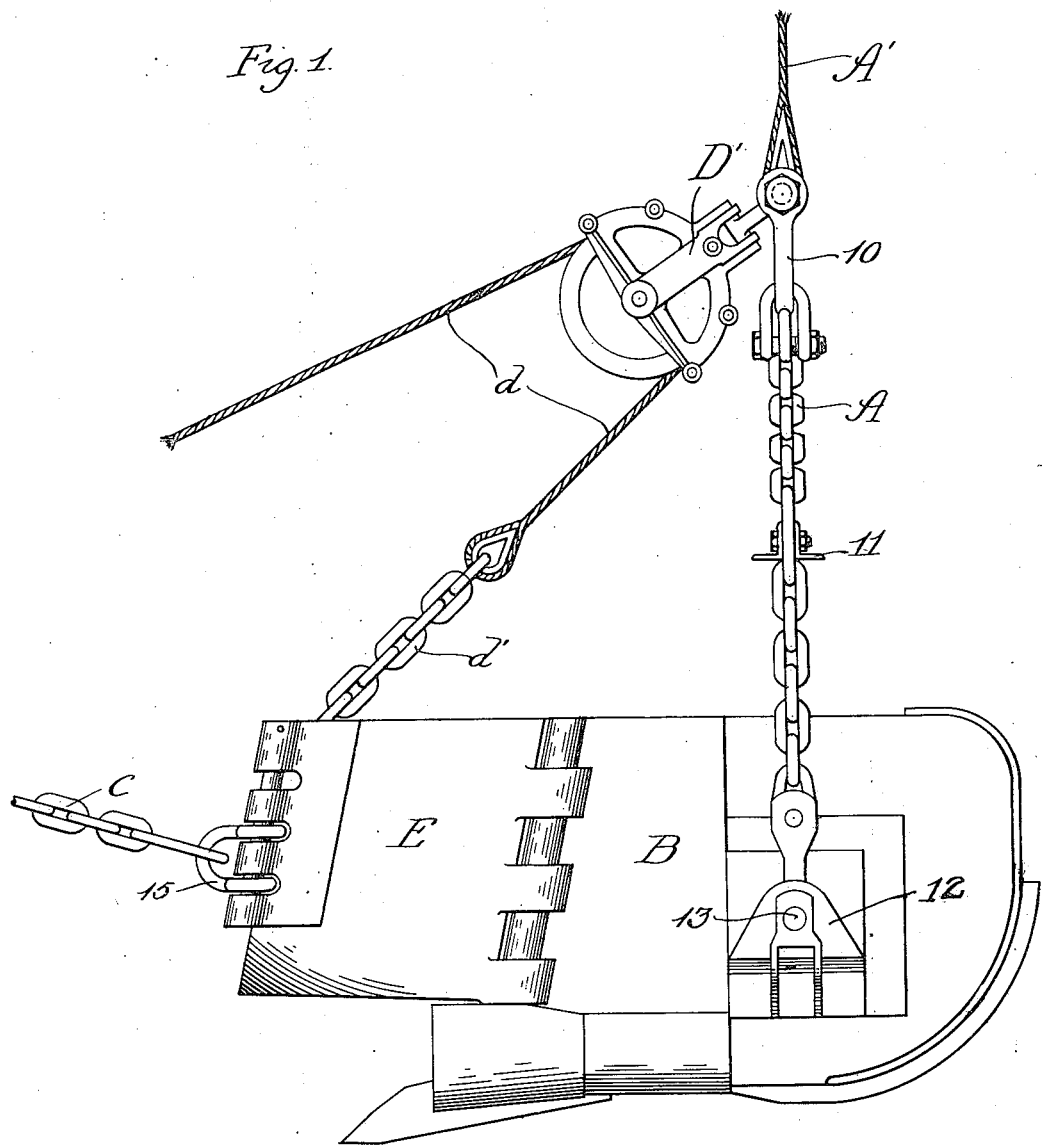

April 22, 1924.

J. W. PAGE 1,491,414

EXCAVATING SHOVEL

Filed June 24, 1921    3 Sheets-Sheet 1

Inventor:
John W. Page,
By Dyrenforth, Lee, Chritton & Wiles,
Attys

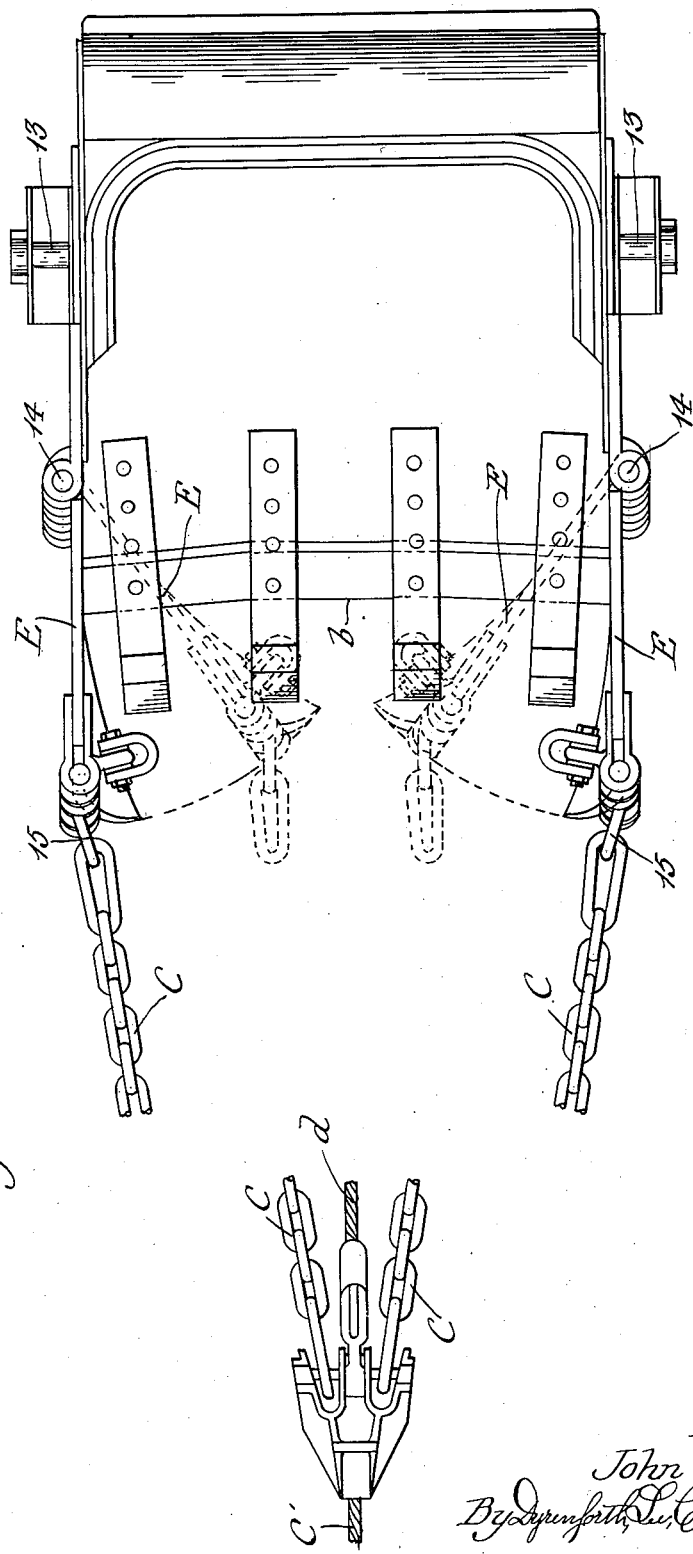

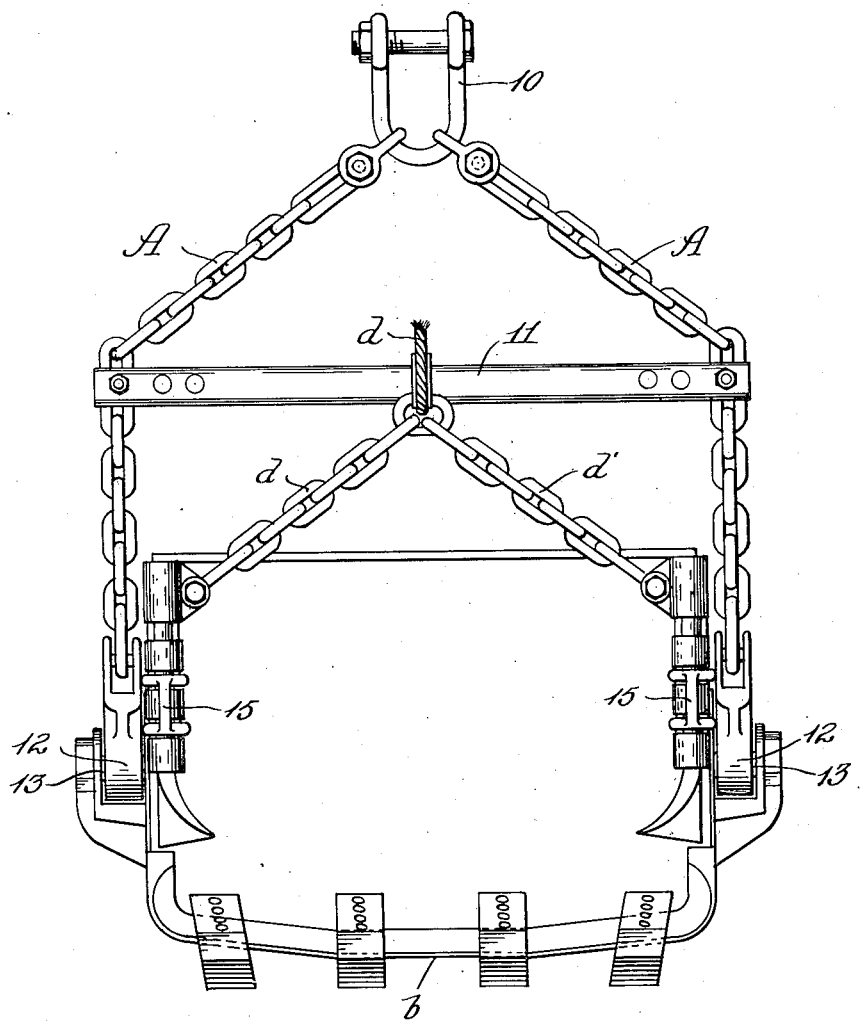

Patented Apr. 22, 1924.

1,491,414

UNITED STATES PATENT OFFICE.

JOHN W. PAGE, OF CHICAGO, ILLINOIS.

EXCAVATING SHOVEL.

Application filed June 24, 1921. Serial No. 480,007.

*To all whom it may concern:*

Be it known that I, JOHN W. PAGE, a citizen of the United States, residing at Chicago, in the county of Cook and State of Illinois, have invented a new and useful Improvement in Excavating Shovels, of which the following is a specification.

This invention relates to improvements in excavating shovels and is fully described and explained in this specification and shown in the accompanying drawings, in which—

Figure 1 is a side elevation of my improved device, Figure 2 is a top plan of the same, showing a part of the chain on the same broken away, and Figure 3 is a front elevation of the same.

The excavating shovel herein shown is an improvement on the shovel shown in my Patent No. 758,380 granted April 26, 1904, and in my Patent No. 916,772 granted March 30, 1909, and the particular features of difference between this shovel and the shovel shown in said patents will be particularly pointed out herein.

Referring to the drawings, A indicates chains pivotally attached to the sides of the shovel at their lower ends, and having their upper ends fastened to a clevis 10 for the attachment of a cable A' by which the shovel can be lifted. The chains A are separated by a spreader bar 11 above the shovel to form a sort of bail.

B indicates the shovel proper which is pivotally secured to the lower ends of the chains A, the points of connection between the chains A and the shovel being behind the center of gravity of the shovel, so that when released the shovel will swing down and dump its contents as is particularly set forth in Patent No. 758,380 granted April 26, 1904, referred to above. The pivotal connection between the lower ends of the chains A and the shovel is accomplished by fastening eyes 12 to the lower ends of the chains, through which extend short horizontal rods 13 mounted on the sides of the shovel. The shovel has at its front lower corner a cutting edge $b$. The sides of the shovel extend forward beyond the cutting edge $b$, to form load-retaining plates E which are pivoted to the sides proper of the shovel at 14. To the front edges of the load-retaining plates E are fastened eyes 15 to which are attached the chains C which perform the same function as the two small hauling-ropes C of my Patent No. 758,380. The hauling-chains C are connected at their forward ends to a hauling-rope C'.

A block D' is attached to the lower end of the lifting cable A' where it is fastened to the clevis 10. Over this block runs a holding-rope $d$, one end of which is secured to the ends of two short holding-chains $d'$ which are secured to the upper forward corners of the load-retaining plates E. The other end of the holding-rope $d$ is fastened at the point of attachment of the hauling-chains C to the main hauling-rope C'.

In general my shovel works the same as the shovel of my patents referred to, each one of the parts doing all that the corresponding parts in the shovel of said patents does. Thus when it is desired to excavate with my shovel, the hauling rope C' can be drawn in by a suitable engine, and the shovel will fill itself with earth in the ordinary way. Thereupon the shovel can be raised by a derrick, if desired, and it will be maintained in a horizontal position as long as tension is maintained on the hauling-rope C'. As the shovel is lifted it is held in a horizontal position as long as the main hauling-rope C' is kept taut, the force for holding the shovel horizontal passing to it at times through the short hauling-chains C, at other times through the holding-rope $d$, and at times over both. The holding-rope $d$ keeps the shovel in a horizontal position only when it is kept under tension by the tautness of the hauling-rope C'. As soon as the tension on the hauling-rope C' is released, therefore, regardless of the level of the shovel, both means for holding the shovel in a horizontal position are released and its own weight swings it down so as to dump its contents.

The efficiency of the shovel as an excavator is increased in my present device by pivoting the forward parts of the sides of the shovel to form the load-retaining plates E. It will be noted that the hauling chains C are relatively long and consequently when under strain lie nearly parallel. By means of this construction, therefore, as the shovel is being drawn forward to scrape up a load, the load-retaining plates E will be open or nearly parallel; that is, substantially in position as indicated by the solid lines in Fig. 2.

When in this open position they will not obstruct the entrance to the shovel, and consequently as the shovel is drawn forward it will scrape up earth in the same manner as the shovel shown in my other patents. It will be noted, however, that the holding-chains $d'$ attached to the end of the holding-rope $d$ are relatively short and do not lie nearly parallel with each other. It will be seen that because of this construction, as soon as tension is put upon these short holding-chains $d'$, the lower ends of which are attached to the ends of the load-retaining plates E, they will cause the load-retaining plates to be pulled in to a closed position as indicated by the broken lines in Fig. 2. In the operation of the shovel, a strain is put upon the holding-chains $d'$ as soon as the shovel commences to leave the ground. The result of this is to close the load-retaining plates and hold additional dirt or material on the shovel, which otherwise would run out over the front edge as the shovel is lifted. The operation of these plates, closing, as the shovel is lifted, also operates to force some material in the shovel which otherwise would not be picked up by it but would be left just in front of its cutting edge as it leaves the ground. The full extent to which these load-retaining plates are closed, in the operation of the device, and the additional amount of material which they will force on the shovel, and the exact amount of material which they will retain on the shovel and prevent from running off of it, will, of course, depend upon the kind of material being excavated and the particular manner in which the shovel is used.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In a device of the class described, the combination with a shovel closed at the rear, of load-retaining plates pivoted on substantially vertical pivots to the forward edges of the sides of said shovel.

2. In a device of the class described, the combination with a shovel closed at the rear and having a front cutting-edge, of means for pivotally supporting the shovel, means for hauling the shovel to load it, means for lifting the shovel, means for maintaining the shovel in load-retaining position, load-retaining plates pivoted on substantially vertical pivots to the forward edges of the sides of the shovel and means for closing the load-retaining plates.

3. In a device of the class described, the combination with a shovel closed at the rear and having a front cutting-edge, of means for pivotally supporting the shovel, means for hauling the shovel to load it, means for lifting the shovel, means for maintaining the shovel in load-retaining position, load-retaining plates pivoted on substantially vertical pivots to the forward edges of the sides of the shovel and means operating on lifting the shovel to close the load-retaining plates.

4. In a device of the class described, a shovel closed at the rear and having load-retaining plates pivoted on substantially vertical pivots to the forward edges of the sides thereof, a supporting member pivoted to the shovel, a cutting-edge on the front of the shovel, hauling means attached to the shovel, a pair of holding-chains extending upwardly from the load-retaining plates, and means for maintaining continuous tension on the hauling means or holding-chains.

5. In a device of the class described, a shovel having load-retaining plates pivoted on substantially vertical pivots to the forward edges of the sides thereof, a supporting member pivoted thereto behind the center of gravity thereof, a cutting edge on the front of the shovel, hauling-means attached to the shovel above and in front of the cutting-edge, a pair of holding-chains extending upwardly from the load-retaining plates, and means for maintaining continuous tension on the hauling-means or the holding-chains.

6. The combination with a shovel having load-retaining plates pivoted to the forward edges of the sides thereof, of a supporting member pivoted to the shovel, a cutting-edge at the front of the shovel, hauling-means attached to the shovel, a block on the supporting device, and a holding-rope running over said block and having one end attached to the hauling-means and the other end attached to the load-retaining plates.

7. The combination with a shovel having load-retaining plates pivoted to the forward edges of the sides thereof, of supporting members pivoted thereto behind the center of gravity thereof, a cutting-edge at the front of the shovel, hauling-means attached to the shovel above and in front of the cutting edge, a block on the supporting device and a holding-rope running from the front of said shovel over said block to the hauling-means.

8. In a device of the class described, a shovel with load-retaining plates pivoted on substantially vertical pivots to the forward edges of the sides thereof, a supporting member pivoted to the shovel, a rope adapted to exert an upward pull on said shovel, a rope adapted to exert a substantially horizontal pull on said shovel, and means for maintaining continuous tension upon one or the other of said ropes.

9. The combination with a shovel having load-retaining plates pivoted to the forward edges of the sides thereof, of supporting members pivoted thereto behind the center of gravity thereof, a cutting-edge at the front of the shovel, hauling-means pivoted to the shovel above and in front of the cutting-edge, a block on the supporting device and a pair of holding-chains attached to the load-retaining plates and joined to a holding-rope running over said block to the hauling-means.

10. In a device of the class described, the combination with a suitable shovel, of a supporting member therefor pivoted thereto at a point behind the center of gravity thereof, a pulley attached to said supporting member above said shovel, a holding-rope running over said pulley and secured to said shovel, means interposed between the holding-rope and the shovel whereby tension on the holding-rope will close the front of the shovel, a hauling-rope also secured to said shovel, and a main hauling-rope connected to the ends of said first-named ropes.

11. In a device of the class described, a shovel closed at the rear and having load-retaining plates pivoted on substantially vertical pivots to the forward edges of the sides thereof, means for hauling the shovel, means for lifting the shovel, and holding means connecting the load-retaining plates to the hauling-means whereby tension on said holding means will close the load-retaining plates.

In testimony whereof I have hereunto set my hand and seal this 22 day of June, 1921.

JOHN W. PAGE. [L. S.]